(12) United States Patent
Moon (10) Patent No.: US 7,970,270 B2
(45) Date of Patent: Jun. 28, 2011

(54) AUTO FOCUSING APPARATUS AND IMAGE PICK-UP APPARATUS HAVING SUB-MIRROR

(75) Inventor: Jae-Joon Moon, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 12/604,119

(22) Filed: Oct. 22, 2009

(65) Prior Publication Data

US 2010/0124413 A1    May 20, 2010

(30) Foreign Application Priority Data

Nov. 18, 2008 (KR) .................. 10-2008-0114647

(51) Int. Cl.
*G02B 7/28* (2006.01)
*G03B 19/12* (2006.01)

(52) U.S. Cl. ........................ 396/117; 396/358

(58) Field of Classification Search .......... 396/117, 396/358; 359/201.2
See application file for complete search history.

(56) References Cited

U.S. PATENT DOCUMENTS

| | | | |
|---|---|---|---|
| 2004/0155976 A1* | 8/2004 | Suda | 348/345 |
| 2006/0275026 A1* | 12/2006 | Oikawa | 396/111 |
| 2010/0104271 A1* | 4/2010 | Park et al. | 396/111 |

* cited by examiner

*Primary Examiner* — W. B. Perkey
*Assistant Examiner* — Dennis Hancock
(74) *Attorney, Agent, or Firm* — The Farrell Law Firm, P.C.

(57) ABSTRACT

An image pick-up apparatus capable of directing an increase amount of light toward an auto focus module and of performing a fast auto focusing is disclosed. The image pick-up apparatus includes a photographing lens to focus light received from a subject, a main mirror to pass a portion of the light passing through the photographing lens and reflect remaining light, an auto focus module to detect a focus state of the photographing lens and a sub-mirror operable independently from the main mirror to guide the light passing through the photographing lens toward the auto focus module.

19 Claims, 8 Drawing Sheets

AUTO FOCUSING APPARATUS AND IMAGE PICK-UP APPARATUS HAVING SUB-MIRROR

CROSS-REFERENCE TO RELATED APPLICATIONS

This application claims priority under 35 U.S.C. §119 from Korean Patent Application No. 10-2008-114647, filed on Nov. 18, 2008, in the Korean Intellectual Property Office, the disclosure of which is incorporated herein by reference in its entirety.

TECHNICAL FIELD

The present disclosure relates generally to an auto focusing apparatus and an image pick-up apparatus having the same, and, more particularly, to an image pick up apparatus having a sub-mirror that guides light received from a subject toward an auto focus module of the image pick-up apparatus.

BACKGROUND OF RELATED ART

An image pick-up apparatus such as a camera is typically includes an auto focusing feature to the convenience of affecting the focusing on the subject automatically. To achieve the automatic focusing, a through-the-lens (TTL) auto focusing method, which utilizes the light entering through a photographing lens, is often used. An auto focus module may detect whether the subject is in focus or not by employing the contrast detection method or the phase difference detection method. In the contrast detection method, repeated calculations of the contrast of a portion of an image (mainly, a center portion) are made while moving the lens with the subject being deemed in focus when the contrast reaches a maximum value. The contrast detection method is generally used in video cameras and compact digital cameras. According to the phase difference detection method, the incoming light received through a lens is divided into a pair of light beams, which are compared with each other to determine whether the subject is in focus. The phase difference detection method may be thought as operating in a similar way as the manual focusing through a split image screen, for example. Most of film SLR cameras and digital SLR cameras currently available use the phase difference detection method.

In the above described TTL auto focusing methods employed in a SLR camera, the light entering through a photographing lens is made incident on a main mirror that is partially reflective to reflect some of the light toward the view finder while allowing the remainder portion of the light to pass therethrough. The light passing through the main mirror is then reflected in the direction of an auto focus module off a sub-mirror positioned behind the main mirror. The main mirror and the sub-mirror of a conventional image pick-up apparatus are arranged to operate in unison so that a portion less than the total amount of the available light becomes incident on the auto focus module, which makes it difficult to focus on the subject under a low light condition. Further in such conventional image pick-up apparatus that provide a live view mode, which mode provides a display, e.g., on a liquid crystal display (LCD) screen, of the image acquired from the light incident on an image pick-up area thereby allowing the user to view the scene to be photographed on the display screen, when the phase difference auto focusing is performed, a reduction in the operational speed may be experienced due to the shutter lag resulting from the necessary movements of the main mirror and the sub mirror. Thus, improved configuration and/or operation of the main mirror and sub-mirror arc thus desired.

SUMMARY OF DISCLOSURE

According to an aspect of the present disclosure, there is provided an image pick-up apparatus that may comprise a photographing lens, a main mirror, an auto focus module and a sub-mirror. The photographing lens may be arranged to focus light received from a subject. The main mirror may be arranged so that light passing through the photographing lens is incident thereupon, and may be partially reflective such that a portion of the light passing through the photographing lens is allowed to pass through the main mirror while remaining portion of the light passing through the photographing lens is reflected off the main mirror. The auto focus module may be configured to detect the state of focus of the photographing lens on the subject. The sub-mirror may be operable to move independently from a movement of the main mirror, and may be arranged to reflect the light passing through the photographing lens toward the auto focus module.

The auto focusing apparatus may be operable in a low light mode in which mode the light passing through the photographing lens is reflected by the sub-mirror toward the auto focus module without being incident upon the main mirror.

The auto focusing apparatus may be operable in a live view mode in which mode the light passing through the photographing lens is reflected by the sub-mirror toward the auto focus module without being incident upon the main mirror.

The image pick-up apparatus may further comprise a light detector that may be configured to. detect an amount of the light passing through the photographing lens.

The sub-mirror may comprise at least two sub-mirrors arranged such that a select one of the at least two sub-mirrors is positioned in an optical path of the light passing through the photographing lens, the select one of the at least two sub-mirrors being selected according to a section of one of a plurality of operational modes of the image pick-up apparatus.

The plurality of operational modes may comprise a live view mode and a view finder mode. The at least two sub-mirrors may comprise a first sub-mirror selected to be positioned in the optical path in the live view mode and a second sub-mirror selected to be positioned in the optical path in the view finder mode.

The first sub-mirror may be partially reflective allowing a passage therethrough of a portion of an incident light incident thereupon and reflecting remaining portion of the incident light.

The second sub-mirror reflects substantially all of light incident thereupon.

According to another aspect of the present disclosure, an auto focusing apparatus may be provided to include an auto focus module and a sub-mirror. The auto focus module may be configured to detect a focus state of a photographing lens. The sub-mirror may be operable to move independently from a movement of a main mirror, and may be arranged to reflect light passing through the photographing lens toward the auto focus module.

The auto focusing apparatus may be operable in a low light mode in which mode the light passing through the photographing lens is reflected by the sub-mirror toward the auto focus module without being incident upon the main mirror.

The auto focusing apparatus may be operable in a live view mode in which mode the light passing through the photographing lens is reflected by the sub-mirror toward the auto focus module without being incident upon the main mirror.

The auto focusing apparatus may further comprise a light detector configured to detect an amount of the light passing through the photographing lens.

The sub-mirror may comprise at least two sub-mirrors arranged such that a select one of the at least two sub-mirrors is positioned in an optical path of the light passing through the photographing lens, the selected one of the at least two sub-mirrors being selected on the basis of a section of one of a plurality of operational modes.

The plurality of operational modes may comprise a live view mode and a view finder mode. The at least two sub-mirrors may comprise a first sub-mirror selected to be positioned in the optical path in the live view mode and a second sub-mirror selected to be positioned in the optical path in the view finder mode.

The first sub-mirror may be partially reflective allowing a passage therethrough of a portion of an incident light incident thereupon and reflecting remaining portion of the incident light.

The second sub-mirror may reflect substantially all of light incident thereupon.

According to yet another aspect, there may be provided an image acquisition apparatus having one or more photographing lenses through which light received from a subject passes along an optical path to an image pick up area upon which the light from the subject passing through the one or more photographing lenses is capable of being incident to thereby form an optical image of the subject on the image pick up area. The image acquisition apparatus may comprise a first mirror and a second mirror. The first and second mirrors may each be arranged between the one or more photographing lenses and the image pick up area. Each of the first and second mirrors may be moveable selectively into and out of the optical path in such manner allowing an arrangement of the first and second mirrors in which only one of the first and second mirrors is positioned in the optical path between the one or more photographing lenses and the image pick up area to have the light passing through the one or more photographing lenses incident thereupon.

At least one of the first and second mirrors may be partially reflective so as to allow a portion of light incident thereupon to pass therethrough while reflecting remaining portion of the light incident thereupon.

At least one of the first and second mirrors may comprise at least two mirrors, each of which may be moveable along a direction perpendicular to an optical axis of at least one of the one or more photographing lenses. A first one of the at least two mirrors may be partially reflective so as to allow a portion of light incident thereupon to pass therethrough while reflecting remaining portion of the light incident thereupon. A second one of the at least two mirrors may reflect substantially all of light incident thereupon.

The first mirror may be arranged upstream of the second mirror in the optical path, and may be partially reflective so as to allow a portion of light incident thereupon to pass therethrough while reflecting remaining portion of the light incident thereupon. The second mirror may reflect substantially all of light incident thereupon.

BRIEF DESCRIPTION OF THE DRAWINGS

Various features and advantages of the present disclosure will become more apparent by the following detailed description of several embodiments thereof with reference to the attached drawings, of which.

DETAILED DESCRIPTION OF SEVERAL EMBODIMENTS

Reference will now be made in detail to the embodiment, examples of which are illustrated in the accompanying drawings, wherein like reference numerals refer to like elements throughout. While the embodiments are described with detailed construction and elements to assist in a comprehensive understanding of the various applications and advantages of the embodiments, it should be apparent however that the embodiments may be carried out without those specifically detailed particulars. Also, well-known functions or constructions will not be described in detail so as to avoid obscuring the description with unnecessary detail. It should be also noted that in the drawings, the dimensions of the features are not intended to be to true scale and may be exaggerated for the sake of allowing greater understanding.

Figure 1:
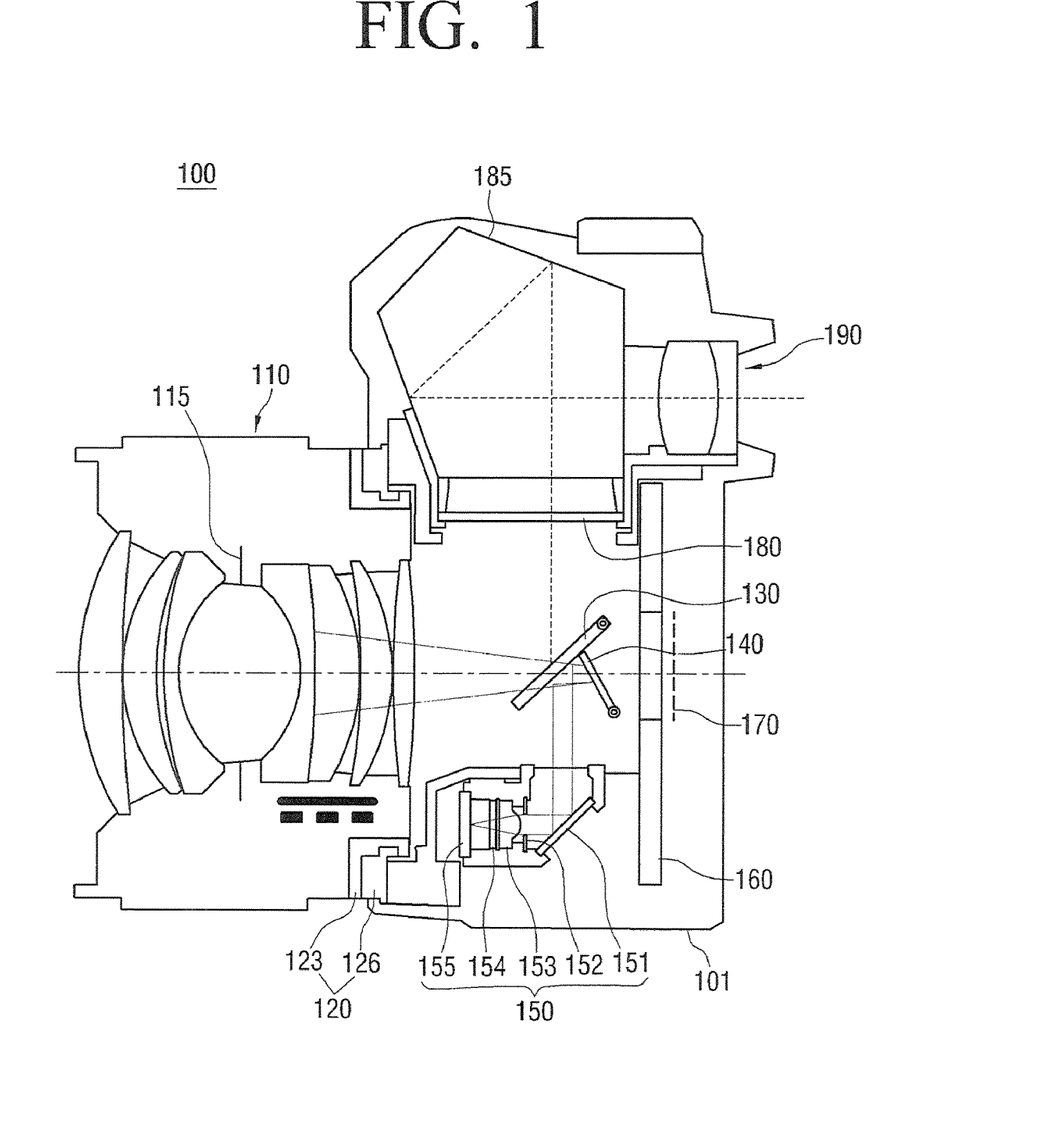
FIG. 1 is a view illustrating an image pick-up apparatus according to an embodiment of the present disclosure.
Figure 2:
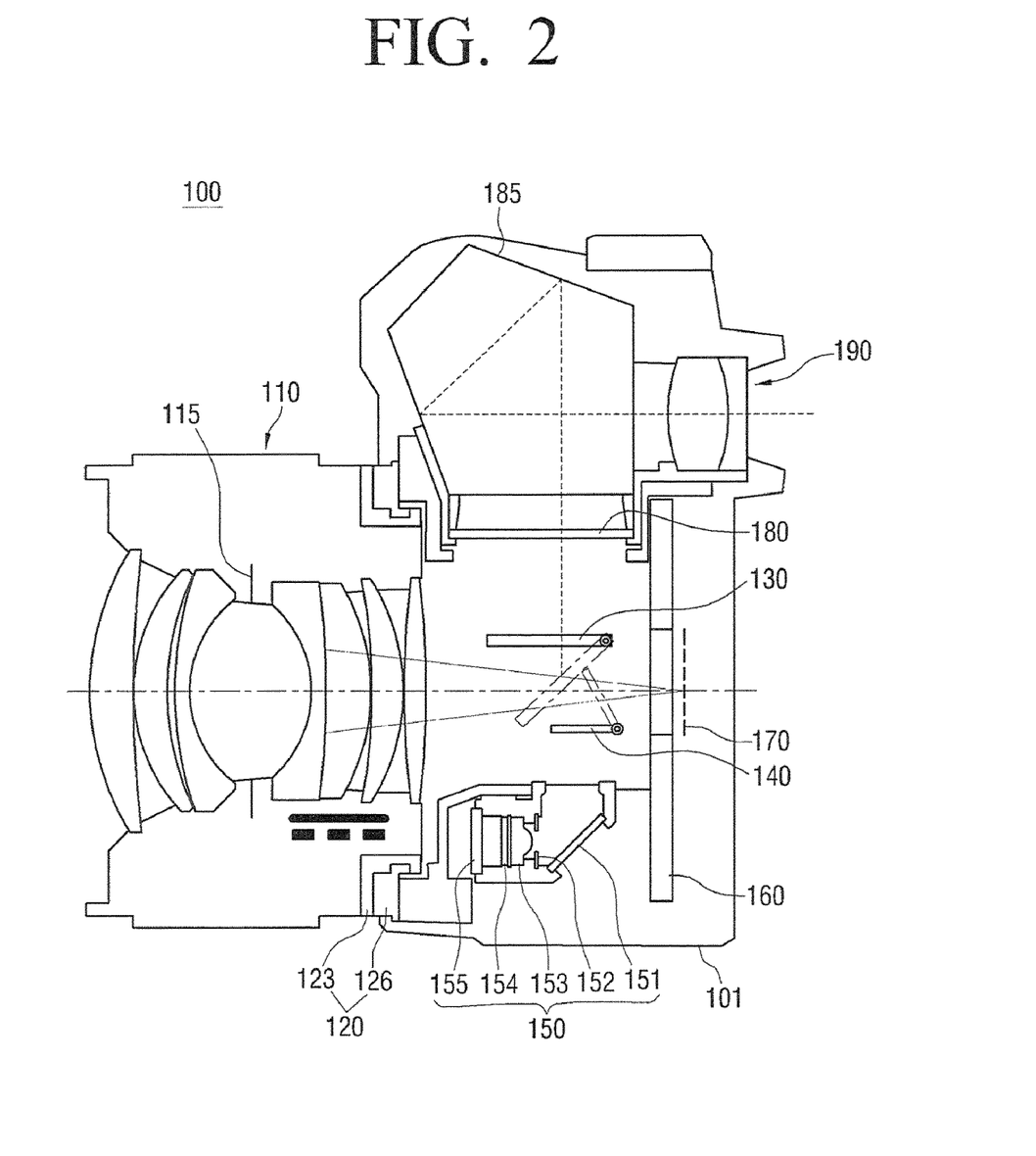
FIG. 2 is a view illustrating the image pick-up apparatus of FIG. 1 when a subject image is being picked up.

FIG. 1 illustrates an image pick-up apparatus 100 according to an embodiment of the present disclosure. FIG. 2 illustrates the image pick-up apparatus 100 when a subject image is being picked up.

The image pick-up apparatus 100 according to an embodiment may be a digital single lens reflect (DSLR) camera. It should be noted however that the DSLR camera is only one illustrative example type of image pick-up apparatus, and that aspects of the present disclosure are applicable to any other types of image pick-up apparatus besides the DSLR camera.

The image pick-up apparatus 100 shown in FIG. 1 may comprise a photographing lens 110, a mount 120, a main mirror 130, a sub-mirror 140, an auto focus module 150, a focal plane shutter 160, an image pick-up area 170, a focusing screen 180, a penta prism 185 and an eyepiece 190.

The photographing lens 110 may focuses light received from a subject on the image pick-up area 170. As shown in FIG. 1, the photographing lens 110 may comprise a plurality of lenses. The photographing lens 110 may be detachable, and thus may be interchangeable in some embodiments, particularly in the case of a DSLR camera.

The photographing lens 110 may also comprises a 'hand-shake' correction apparatus (not shown) and an auto focus driver (not shown). The hand-shake correction apparatus may operate to mitigate degradation, e.g., blurring, of the image quality of a photograph resulting from the shaking movement of the user's hand. The auto focus driver may receive information regarding the focus state of the photographing lens 110 from the auto focus module 150, and may move a lens or lenses based on the information so as to bring the lens photographing lens 110 into focus.

The photographing lens 110 may comprises a diaphragm or iris 115. The diaphragm 115 may regulate the amount of light passing through the photographing lens 110, and may also change the depth of field of the resulting image. That is, when the opening of the diaphragm 115 is enlarged or widened, the photographing lens 110 passes a larger amount of light so as to allow a brighter picture to be taken. However, with the wider opening of the diaphragm 115, the aperture also becomes larger, which results in the reduction in the depth of field of the resulting picture. On the other hand, when the opening of the diaphragm 115 is made narrower, the photographing lens 110 passes a smaller amount of light, resulting in a photo darker photograph. With the narrower opening of the diaphragm 115 however, the aperture becomes smaller so that the photo of higher depth of field can be obtained.

The diaphragm 115 may be arranged between the lenses such that that an image is formed by the lenses. More specifically, a virtual image of the diaphragm 115 which is formed by a lens or lenses arranged ahead of the diaphragm 115 (between the subject and the diaphragm) is referred to as the entrance pupil while a virtual image formed by a lens or lenses arranged at the back of the diaphragm 150 (between the diaphragm and the image pick-up area) is referred to as the exit pupil. The exit pupil is an image of the diaphragm 150 that plays an important role in the brightness of the resulting photograph, and thus is considered to be an important factor in controlling the brightness and for auto focusing.

The mount 120 allows the photographing lens 110 to be mounted to a body 101 of the image pick-up apparatus 100. The mount 120 may also align the center of the image pick-up area 170 to coincide with the optical axis of the photographing lens 110. The mount 120 according to an embodiment allows a detachable mounting of the photographing lens 110 so that the photographing lens 110 can be replaced with another photographing lens.

To that end, the mount 120 may comprises a lens mount 123 and a body mount 126. The lens mount 123 and the body mount 126 may be capable of engaging with each other such that the photographing lens 110 can be fixed to the body 101 of the image pick-up apparatus 100.

The main mirror 130 may be partially reflective so as to pass therethrough a portion of light received through the photographing lens 110 while reflecting the remaining portion of the light. The light reflected from the main mirror 130 proceeds toward the focusing screen 180 so that the user can see the subject through the eyepiece 190. The light allowed to pass through the main mirror 130 continues toward the sub-mirror 140.

The sub-mirror 140 may be operated independently from the main minor 130, and may guide the light passing through the photographing lens 110 to the auto focus module 150 so that the auto focus module 150 may be able to detect the focus state of the subject. The sub-mirror 140 will be described in greater detail later.

The auto focus module 150 may detect the focus state of the photographing lens 110. Information regarding the focus state of the photographing lens 110 is transmitted to the auto focus driver (not shown) of the photographing lens 110. Hereinafter, the auto focus module 150 that uses the phase difference detection method will be used as an example for further description for the sake of convenience. The auto focus module 150 may comprise a reflective mirror 151, a visual field mask 152, a separating lens 153, a filter 154 and an auto focus sensor 155.

The reflective mirror 151 may reflect the light incident on the auto focus module 150 toward the auto focus sensor 155. Accordingly, the space of the image pick-up apparatus 100 can be effectively utilized. That is, owing to the change in the direction of the optical path, the height of the image pick-up apparatus 100 can be reduced.

The visual field mask 152 may comprise a plurality of openings. The light that passes through the plurality of openings proceed through the separating lens 153, and thereby form a plurality of subject images on the auto focus sensor 155.

The filter 154 may filter the light so that substantially only visible rays are allowed to pass therethrough. The reasons for the filtering is so that the auto focus sensor 155 may operate on the basis of the visible rays to thereby prevent the possible error when detecting the focus state of the photographing lens 110 on the basis of invisible light. For example, the filter 154 may be an infrared rays cutoff filter.

The auto focus sensor 155 may comprise a plurality of photoelectric elements arranged in a certain area. The subject images formed on the auto focus sensor 155 may be converted into electric signals by the photoelectric elements. Using the electric signals, the focus state of the photographing lens 110 may be determined. The phase difference detection method is well known to those skilled in the related art, a detailed description thereof is thus not necessary.

The focal plane shutter 160 may be disposed in front of the image pick-up area 170, and may include two sheets of black curtain or metallic curtains, which are typically referred to as the front and rear curtains. The focal plane shutter 160 is operated in a manner such that the front curtain is opened to expose the image pick-up area 170 to light in photographing operation, the rear curtain subsequently closing to interrupt the passage of light to the image pick-up area 170. That is, the focal plane shutter 160 uses the time difference between the front curtain and the rear curtain to regulate the shutter speed and thus the exposure time.

The image pick-up area 170 is an area that is exposed to the light so that the subject image is picked up. When the subject image is being acquired, the main mirror 130 and the sub-mirror 140 are withdrawn or retracted from the optical path as shown in FIG. 2. A film may be placed on the image pick-up area 170 in the case of a film camera, whereas image sensor(s) are arranged on the image pick-up area 170 in the case of a digital camera. Examples of such image sensors may include charge-coupled devices (CCDs) and complementary metal-oxide-semiconductors (CMOS) sensors. Presently, CCDs are used in most digital cameras because of the higher sensitivity of the CCDs to even low intensity light and the generally good image quality realizable with the CCDs. However, the CCD has complicated manufacturing process, and are comparatively more expensive than the CMOS sensors. The CMOS sensor owing to its simpler manufacturing process and lower costs is generally used in cheaper digital cameras. However, with the recent developments in the image processing technology that have made it possible to achieve a high image quality with a newer CMOS sensor, the use of the CMOS sensors are becoming increasingly wide spread, and can be found even in some DSLR cameras intended for professional use.

The focusing screen 180 may comprise a mat surface and a Fresnel lens. The mat surface is arranged in a position optically equivalent to a focal surface in photographing operation.

Accordingly, an image that is substantially the same as the photographed image may appear on the mat surface. The Fresnel lens may collect the light passing through the mat surface to allow the user to see a brighter image through the eyepiece 190.

The pentaprism 185 (also referred to as a roof pentaprism) is a pentagonal shaped prism that reflects a laterally-reversed image (i.e., reversed 'handedness'—left-to-right reversed) into a correctly oriented image as it would appear to the naked eye. Therefore, the user can see the same image to be photographed through the view finder in the proper lateral orientation.

The eyepiece 190 may create a virtual image, e.g., at one meter in front thereof, so that the user may view the image of the subject projected on the focusing screen 180 that is properly framed. Accordingly, the user may be able to view the image to be photographed through the eyepiece 190.

In order for the auto focus module 150 to operate effectively, the auto focus module 150 needs a sufficient amount of light to be incident thereupon. However, when an excessive proportion of the light passing through the photographing lens 110 is directed toward the auto focus module 150, the amount of light reflected from the main mirror 130 toward the eyepiece 190 may be proportionally reduced, which may in turn result in the inability of the user to see a clear through the eyepiece 190. Therefore, it may be necessary to appropriately regulate the amount of light directed toward the auto focus module 150.

Figure 3:
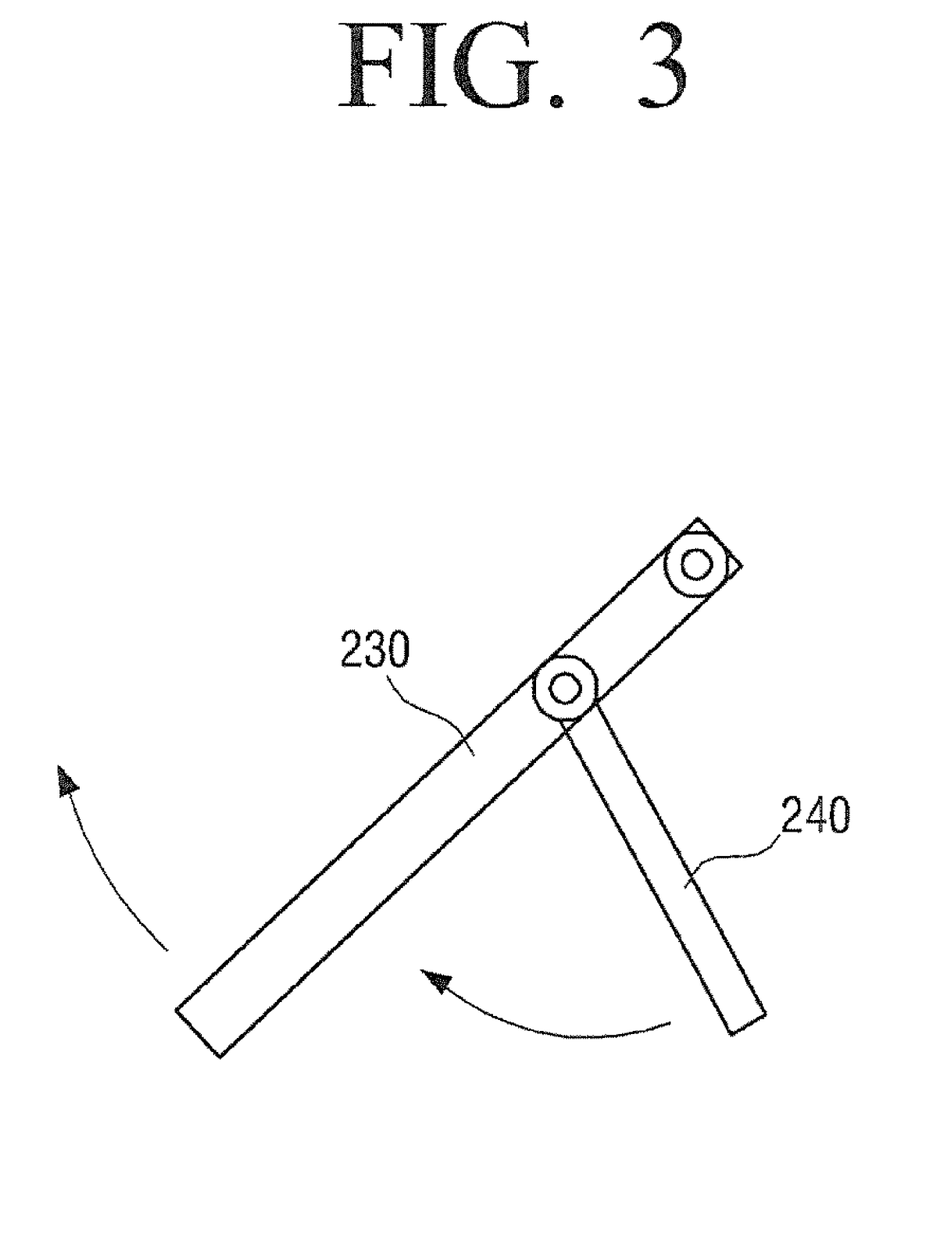
FIG. 3 is a view schematically illustrating a conventional main mirror and a conventional sub-mirror during auto focusing operation.
Figure 4:
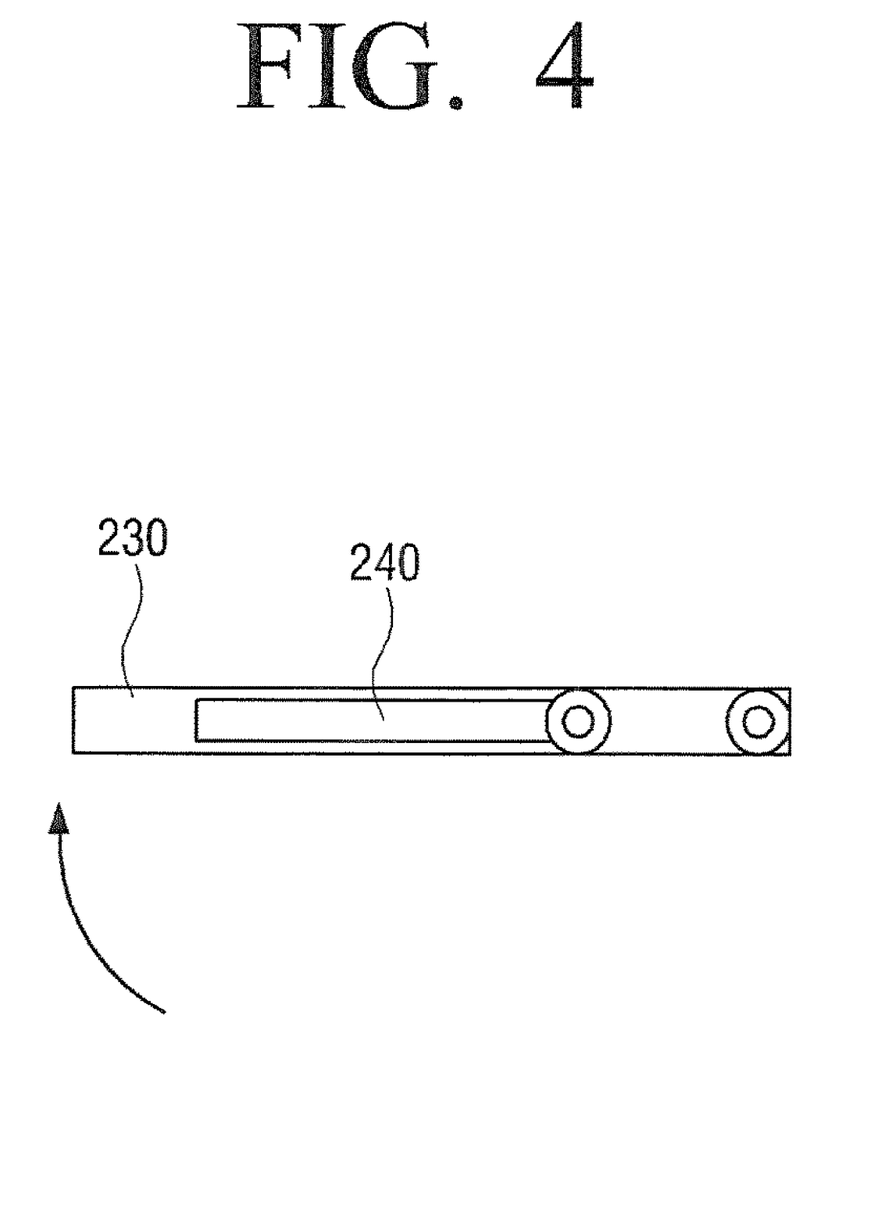
FIG. 4 is a view schematically illustrating a conventional main mirror and a conventional sub mirror when a subject image is being picked up.

FIG. 3 schematically illustrates a conventional main mirror 230 and a conventional sub-mirror 240 during an auto focusing operation whereas FIG. 4 schematically illustrates the conventional main mirror 230 and the conventional sub-mirror 240 during when the subject image is be acquired.

As illustrated in FIG. 3, in a conventional image pick-up apparatus, the main mirror 230 and the sub-mirror 240 are arranged to operate together in concert with each other to allow the light passing through the main mirror 230 to be reflected off the sub-mirror 240 toward the an auto focus module. In such configuration, in a low light condition, the amount of light entering the auto focus module may become insufficient as some portion of the incoming light is always reflected by the main, and thus would not be available for the auto focus module. In addition, since both the main mirror 230 and the sub-mirror 240 move together in dependence with each other, there may be a noticeable shutter lag when an auto focusing is performed during when the image pick-up apparatus is operating in a live view mode—a mode in which the user is allowed to view the scene being photographed on a display, for example a liquid crystal display (LCD) screen, by displaying the scene obtained by electronically processing the light incident on an image pick-up area. That is, when such a conventional image pick-up apparatus is in the live view mode, both the main mirror 230 and the sub-mirror 240 are retracted out of the optical path as shown in FIG. 4 in order to allow the light from the photographing lens 110 to become incident on the image pick-up area so the picked up image may be displayed on the display screen. However, in order to perform the auto focusing, the main mirror 230 and the sub-mirror 240 need to be positioned and arranged as shown in FIG. 3 to guide the light to the auto focus module.

In the above described conventional image pick-up apparatus, the mirrors 230 and 240 descend to the positions shown in FIG. 3 to perform the auto focusing operation, and again ascend to the positions shown in FIG. 3 for the purpose of taking a photograph. That is, it may be possible to photograph an image only after the mirrors (230 and 240) and the focal plane shutter move at least twice between the positions. These movements of the mirrors and the shutter results in a shutter lag due to which the photographing is not performed immediately after the shutter button is pressed, but is performed after a certain delay. This makes it difficult to capture a fast-moving subject. For example, even when the shutter is pressed with a person running from left to right appearing at the center of the frame, the person may appear in the right portion of the actual photographed frame. In addition, during the short period of time when the focal plane shutter is closed or the mirrors 230 and 240 are positioned in the optical path, the live view display may be interrupted.

Figure 5:
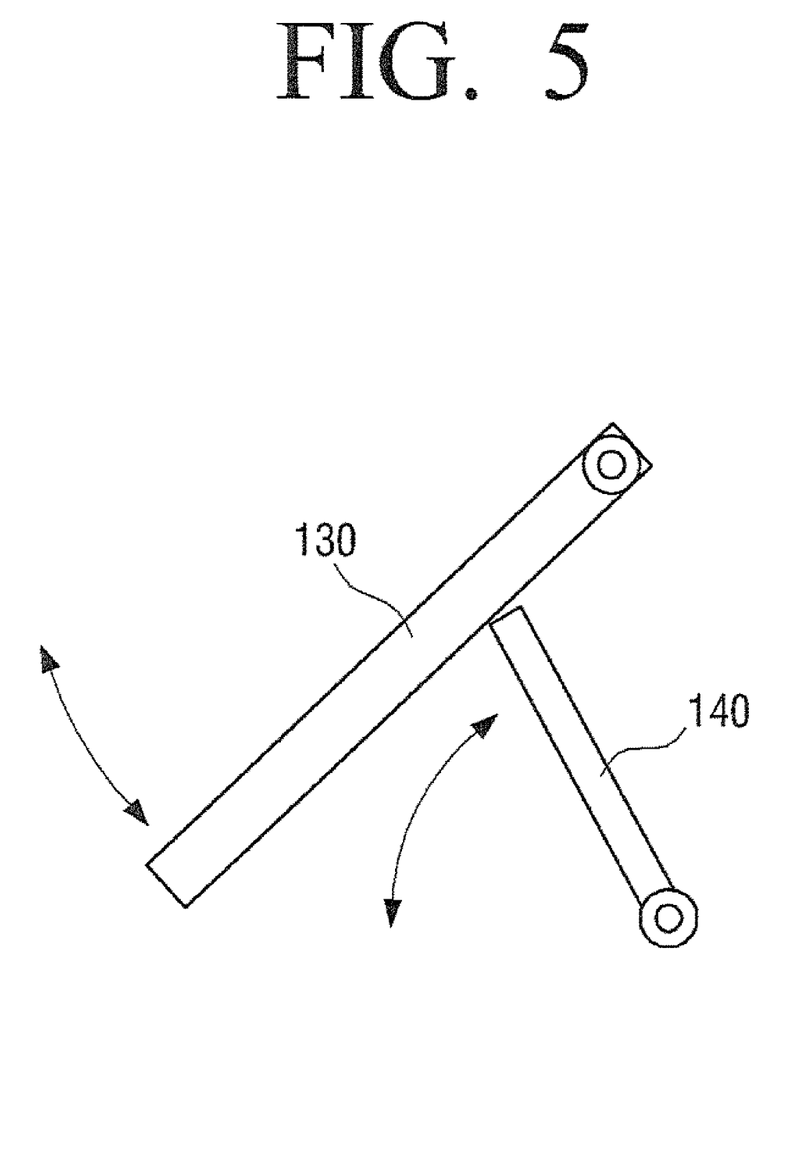
FIG. 5 is a view illustrating independent operations of a main mirror and a sub mirror according to an embodiment of the present disclosure.
Figure 6:
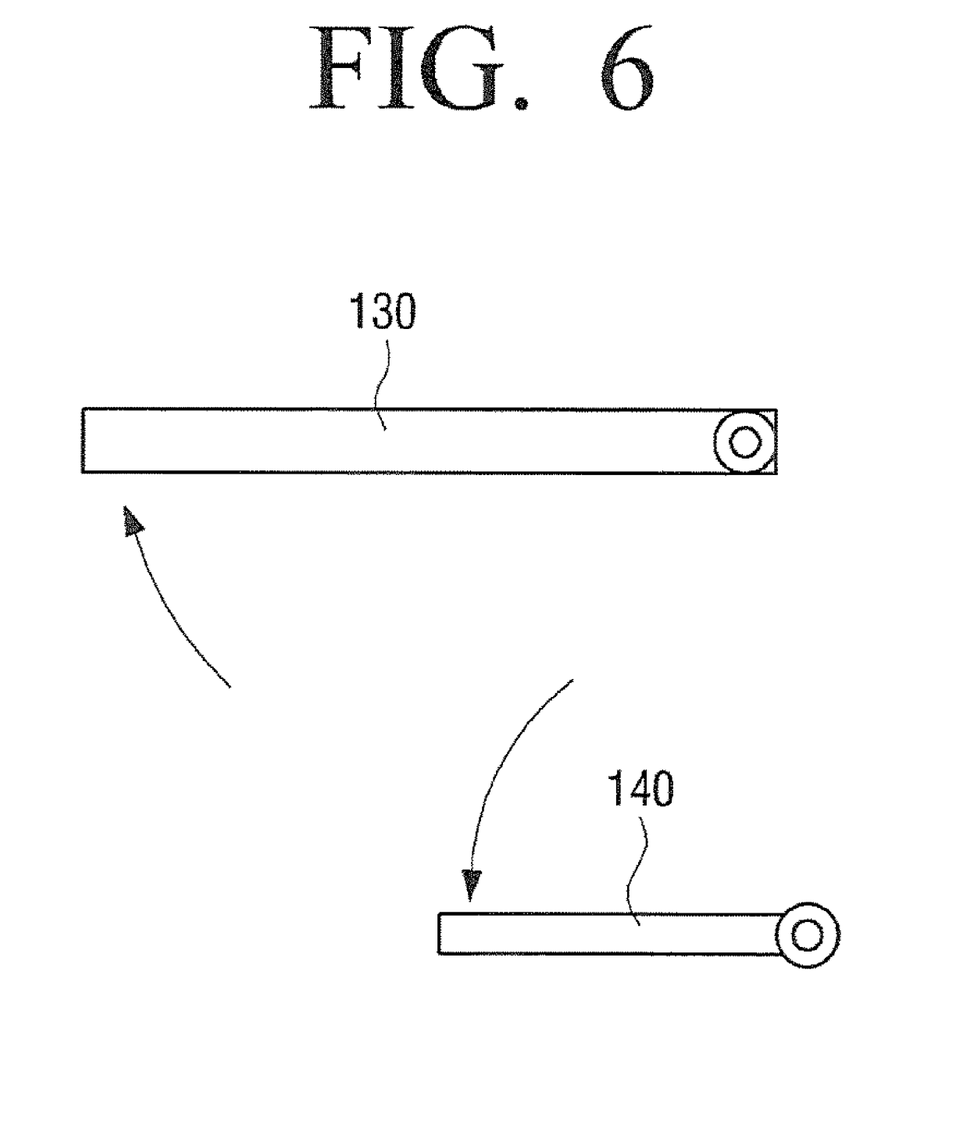
FIG. 6 is a view illustrating independent operations of the main mirror and the sub mirror of FIG. 5 when a subject image is being picked up and when a live view mode is activated.
Figure 7:
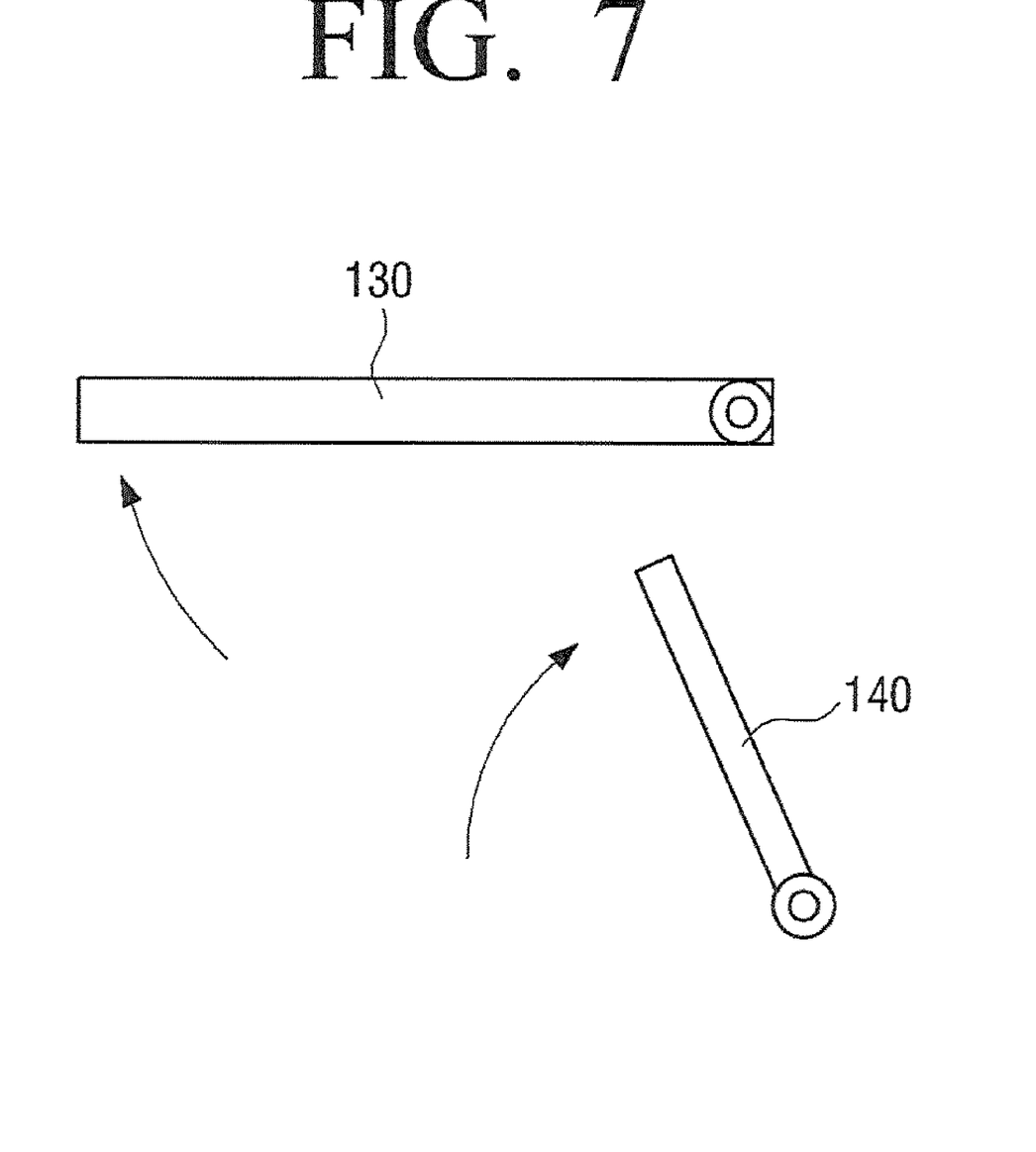
FIG. 7 is a view illustrating independent operations of the main mirror and the sub mirror of FIG. 5 when auto focusing operation is performed under a low light condition in a live view mode.

FIGS. 5, 6 and 7 illustrate the main mirror 130 and the sub-mirror 140 according to an embodiment of the present disclosure. FIG. 5 illustrates the independent operations of the main mirror and the sub-mirror according to an embodiment. FIG. 6 illustrates the independent operations of the main mirror and the sub-mirror during the acquisition of the subject image and in a live view mode according to an embodiment. FIG. 7 illustrates the independent operations of the main mirror and the sub-mirror during an auto focusing operation being performed in a low light mode and in a live view mode according to an embodiment. With reference to FIGS. 5, 6, and 7, the operations of the main mirror 130 and the sub-mirror 140 will now be described in greater detail.

In a general mode of operation, the main mirror 130 and the sub-mirror 140 may operate in substantially the same arrangement as the conventional arrangement previously described. That is, as shown FIG. 5, both of the main mirror 130 and the sub-mirror 140 are positioned on the optical path such that the main mirror 130 guides a part of light passing through the photographing lens 110 to the eyepiece 190 and that the sub-mirror 140 guides the light passing through the main mirror 130 to the auto focus module 150.

When the focus state of the photographing lens 110 is to be detected in a low light mode, however, the arrangement of the main mirror 130 and the sub mirror 140 may change from the configuration of FIG. 5 to the configuration shown in FIG. 7. That is, the main mirror 130 is retracted or withdrawn away from the optical path to only have the sub-mirror 140 remaining on the optical path. This operation is possible since the sub-mirror 140 operates independently from the main mirror 130. As shown in FIG. 7, only the sub-mirror 140 reflects the light that has passed through the photographing lens 10 toward the auto focus module 150. Since the light passing through the photographing lens 110 need not pass through the main mirror 130, the amount of light entering the auto focus module 150 can be larger in comparison with the case where the main mirror 130 reflects a portion of the light away from the auto focus module 150. Thus, in the low light mode, the auto focus module 150 may be able to detect the focus state of the photographing lens 110 even with low level of light entering the lens. In the operation in the low light mode illustrated in FIG. 7, during the short period of time when the main mirror 130 is withdrawn from the optical path for the purpose of performing the auto focusing, the subject may not appear on the eyepiece 190. However, this should not present an inconvenience of any significance since the duration of the interruption is very short.

According to an embodiment, a light detector may be provided for detecting the insufficiency in the amount of light, which such detection may be used by the image pick-up apparatus to automatically enter the low light mode. That is, either the general light mode or the low light mode may be selected based on the amount of light detected by the light detector, and the main mirror 130 and the sub-mirror 140 may operate differently depending on the selected mode.

When operating in the live view mode, the main mirror 130 and the sub-mirror 140 may be in the configuration shown in FIG. 6 for the live view display of the scene being photographed, and may be in the configuration shown in FIG. 7 during the auto focusing operation, resulting in a shorter shutter lag and thus the faster auto focusing and photographing speed.

In the live view mode, for the displaying of the scene, both the main mirror 130 and the sub-mirror 140 are withdrawn from the optical path as shown in FIG. 6. When the focus state of the photographing lens 110 is to be detected in the live view mode, the sub-mirror 140 moves from the position shown in FIG. 6 to the position shown in FIG. 7. That is, no movement of the main mirror 130 is required to switch from the auto focusing operation to the photographing operation, which switching can be accomplished with the movement of only the sub-mirror 140 into and out of the optical path. Accordingly, a reduction in the shutter lag may be possible that allows a faster auto focusing and photographing speed.

Figure 8:
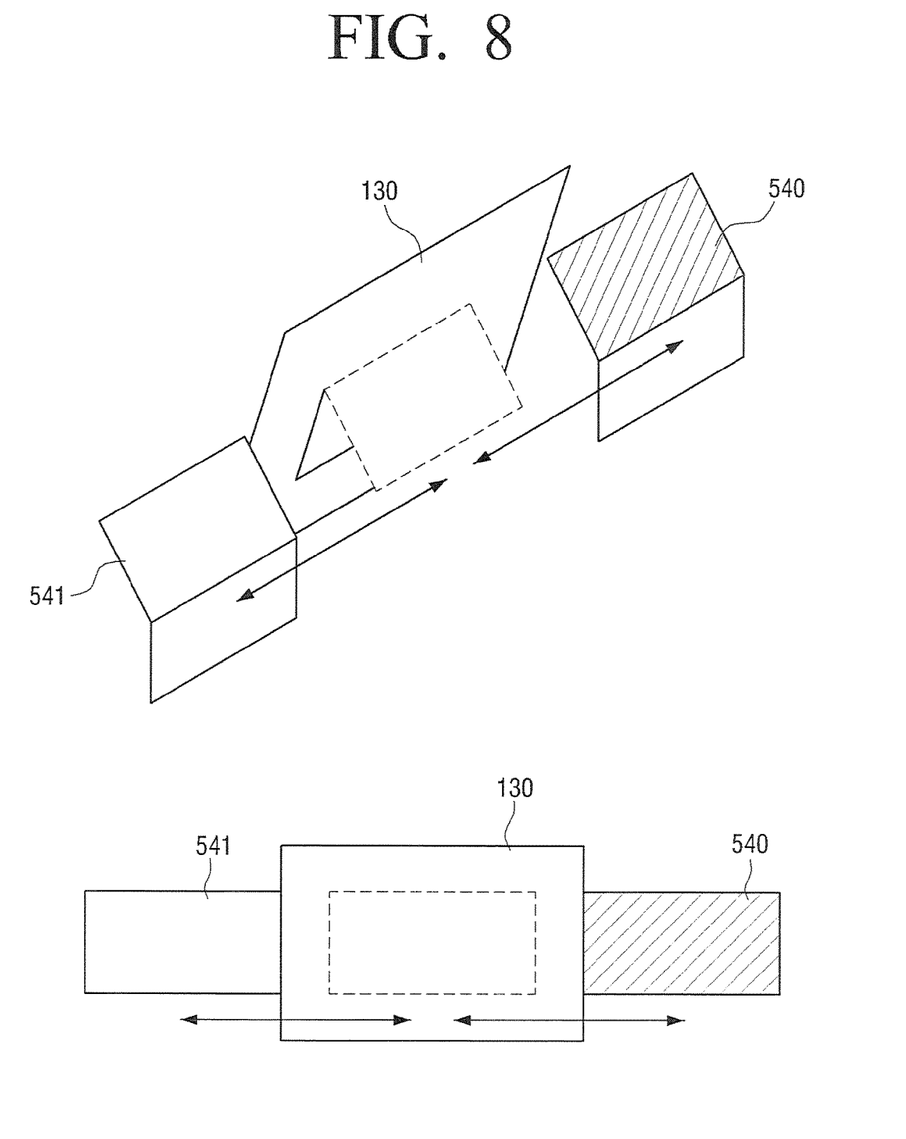
FIG. 8 is a view illustrating another embodiment of the present disclosure, in which a sub-mirror for a view finder mode and a sub mirror for a live view mode are provided.

FIG. 8 illustrates another embodiment in which a plurality of sub-mirrors may be provided. The sub-mirrors may be used selectively in different modes of operation. For purposes of illustration, an example that includes only two sub-mirrors, a sub-mirror for a viewfinder mode 540 and a sub-mirror for a live view mode 541 is shown in FIG. 8, and is described. However, it should be noted that more than two sub-mirrors may be provided in alternative embodiments.

Referring to FIG. 8, the plurality of sub-mirrors 540 and 541 may operate independently from the main mirror 130 in the manner previously described. Additionally, the sub-mirror for the view finder mode 540 and the sub-mirror for the live view mode 541 may be arranged to be movable in a direction perpendicular to the optical path.

In the view finder mode, the sub-mirror for the view finder mode 540 may be located in the optical path while the sub-mirror for the live view mode 541 may be withdrawn from the optical path. The sub-mirror for the view finder mode 540 may have a reflectivity of substantially 100%, which may be the same reflectivity as that of the sub-mirrors previously described.

In the live view mode, on the other hand, the sub-mirror for the live view mode 541 may be located in the optical path while the sub-mirror for the view finder mode 540 may be withdrawn from the optical path. The sub-mirror for the live view mode 541 may be partially reflective such that a portion of light incident on the sub-mirror for the live view mode 541 is incident on the auto focus module 150, whereas the remaining light passes through the sub-mirror for the live view mode 541 to reach the image pick-up area 170. The light entering the image pick-up area 170 may undergo an electronic processing, and may thereby appear on the LCD display screen (not shown). When a sub-mirror for the live view mode 541 is used in the manner described above, a portion of light passing through the photographing lens 110 is always incident on the auto focus module 150, and therefore it may not be necessary to drive the sub-mirror 140 to move to a different location in order to detect the focus state of the photographing lens 110. Accordingly, an improved auto focusing speed is possible.

Accordingly, for an efficient operation of the auto focus module 150, the reflectivity of the sub-mirror 541 for the live view mode may be approximately 40%.

While the disclosure has been particularly shown and described with reference to several embodiments thereof with particular details, it will be apparent to one of ordinary skill in the art that various changes may be made to these embodiments without departing from the principles and spirit of the invention, the scope of which is defined in the following claims and their equivalents.

What is claimed is:

1. An image pick-up apparatus, comprising:
   a photographing lens arranged to focus light received from a subject;
   a main mirror arranged so that light passing through the photographing lens is incident thereupon, the main mirror being partially reflective such that a portion of the light passing through the photographing lens is allowed to pass through the main mirror while remaining portion of the light passing through the photographing lens is reflected off the main mirror;
   an auto focus module configured to detect a state of focus of the photographing lens on the subject; and
   a sub-mirror operable to move independently from a movement of the main mirror, the sub-mirror being arranged to reflect the light passing through the photographing lens toward the auto focus module,
   wherein the auto focusing apparatus is operable in a mode in which the light passing through the photographing lens is reflected by the sub-mirror toward the auto focus module without being incident upon the main mirror.

2. The image pick-up apparatus as claimed in claim 1, wherein the mode is a low light mode.

3. The image pick-up apparatus as claimed in claim 2, further comprising a light detector configured to detect an amount of the light passing through the photographing lens.

4. The image pick-up apparatus as claimed in claim 1, wherein the mode is a live view mode.

5. An image pick-up apparatus, comprising:
   a photographing lens arranged to focus light received from a subject;
   a main mirror arranged so that light passing through the photographing lens is incident thereupon, the main mirror being partially reflective such that a portion of the light passing through the photographing lens is allowed to pass through the main mirror while remaining portion of the light passing through the photographing lens is reflected off the main mirror;
   an auto focus module configured to detect a state of focus of the photographing lens on the subject; and
   a sub-mirror operable to move independently from a movement of the main mirror, the sub-mirror being arranged to reflect the light passing through the photographing lens toward the auto focus module,
   wherein the sub-mirror comprises at least two sub-mirrors arranged such that a select one of the at least two sub-mirrors is positioned in an optical path of the light passing through the photographing lens, the select one of the at least two sub-mirrors being selected according to a section of one of a plurality of operational modes of the image pick-up apparatus.

6. The image pick-up apparatus as claimed in claim 5, wherein the plurality of operational modes comprise a live view mode and a view finder mode, the at least two sub-mirrors comprising a first sub-mirror selected to be positioned in the optical path in the live view mode and a second sub-mirror selected to be positioned in the optical path in the view finder mode.

7. The image pick-up apparatus as claimed in claim 6, wherein the first sub-mirror is partially reflective allowing a passage therethrough of a portion of an incident light incident thereupon and reflecting remaining portion of the incident light.

8. The image pick-up apparatus as claimed in claim 7, wherein the second sub-mirror reflects substantially all of light incident thereupon.

9. An auto focusing apparatus, comprising:
an auto focus module configured to detect a focus state of a photographing lens; and
a sub-mirror operable to move independently from a movement of a main mirror, the sub-mirror being arranged to reflect light passing through the photographing lens toward the auto focus module,
wherein the auto focusing apparatus is operable in a mode in which the light passing through the photographing lens is reflected by the sub-mirror toward the auto focus module without being incident upon the main mirror.

10. The auto focusing apparatus as claimed in claim 9, wherein the mode is a low light mode.

11. The auto focusing apparatus as claimed in claim 10, further comprising a light detector configured to detect an amount of the light passing through the photographing lens.

12. The auto focusing apparatus as claimed in claim 9, wherein the mode is a live view mode.

13. An auto focusing apparatus, comprising:
an auto focus module configured to detect a focus state of a photographing lens; and
a sub-mirror operable to move independently from a movement of a main mirror, the sub-mirror being arranged to reflect light passing through the photographing lens toward the auto focus module,
wherein the sub-mirror comprises at least two sub-mirrors arranged such that a select one of the at least two sub-mirrors is positioned in an optical path of the light passing through the photographing lens, the selected one of the at least two sub-mirrors being selected on the basis of a section of one of a plurality of operational modes.

14. The auto focusing apparatus as claimed in claim 13, wherein the plurality of operational modes comprise a live view mode and a view finder mode, the at least two sub-mirrors comprising a first sub-mirror selected to be positioned in the optical path in the live view mode and a second sub-mirror selected to be positioned in the optical path in the view finder mode.

15. The auto focusing apparatus as claimed in claim 14, wherein the first sub-mirror is partially reflective allowing a passage therethrough of a portion of an incident light incident thereupon and reflecting remaining portion of the incident light.

16. The auto focusing apparatus as claimed in claim 15, wherein the second sub-mirror reflects substantially all of light incident thereupon.

17. An image acquisition apparatus having one or more photographing lenses through which light received from a subject passes along an optical path to an image pick up area upon which the light from the subject passing through the one or more photographing lenses is capable of being incident to thereby form an optical image of the subject on the image pick up area, comprising:
a first mirror arranged between the one or more photographing lenses and the image pick up area; and
a second mirror arranged between the one or more photographing lenses and the image pick up area,
wherein each of the first and second mirrors is moveable selectively into and out of the optical path in such manner allowing an arrangement of the first and second mirrors in which only one of the first and second mirrors is positioned in the optical path between the one or more photographing lenses and the image pick up area to have the light passing through the one or more photographing lenses incident thereupon,
wherein at least one of the first and second mirrors comprises at least two mirrors each moveable along a direction perpendicular to an optical axis of at least one of the one or more photographing lenses, a first one of the at least two mirrors being partially reflective so as to allow a portion of light incident thereupon to pass therethrough while reflecting remaining portion of the light incident thereupon, a second one of the at least two mirrors reflecting substantially all of light incident thereupon.

18. The image acquisition apparatus of claim 17, wherein at least one of the first and second mirrors is partially reflective so as to allow a portion of light incident thereupon to pass therethrough while reflecting remaining portion of the light incident thereupon.

19. The image acquisition apparatus of claim 17, wherein the first mirror is arranged upstream of the second mirror in the optical path, the first mirror being partially reflective so as to allow a portion of light incident thereupon to pass therethrough while reflecting remaining portion of the light incident thereupon, the second mirror reflecting substantially all of light incident thereupon.

* * * * *